United States Patent
Lapp

(10) Patent No.: US 8,205,332 B2
(45) Date of Patent: Jun. 26, 2012

(54) METHOD OF FORMING A CONNECTING ROD FROM TWO DISSIMILIAR MATERIALS BY PROVIDING MATERIAL BLANKS OF DISSIMILIAR MATERIAL, JOINING THE MATERIAL BLANKS AND SUBSEQUENTLY FORMING THE CONNECTING ROD

(75) Inventor: Michael T. Lapp, Bloomfield, MI (US)

(73) Assignee: Mahle International GmbH (DE)

( * ) Notice: Subject to any disclaimer, the term of this patent is extended or adjusted under 35 U.S.C. 154(b) by 710 days.

(21) Appl. No.: 12/330,062

(22) Filed: Dec. 8, 2008

(65) Prior Publication Data
US 2010/0139091 A1   Jun. 10, 2010

(51) Int. Cl.
*F16C 7/00* (2006.01)

(52) U.S. Cl. ........... 29/888.091; 29/888.09; 29/888.092; 228/155; 74/579 R

(58) Field of Classification Search ............ 29/888.091, 29/888.092, 525.14, 557, 888.09, 463; 228/155; 74/579 R, 579 E
See application file for complete search history.

(56) References Cited

U.S. PATENT DOCUMENTS

| | | | | |
|---|---|---|---|---|
| 1,176,301 A | * | 3/1916 | Layman | .................... 29/888.091 |
| RE14,580 E | * | 12/1918 | Layman | .................... 29/888.091 |
| 1,378,690 A | * | 5/1921 | Layman | .................... 29/888.091 |
| 1,647,851 A | * | 11/1927 | Bentley | ......................... 164/69.1 |
| 1,720,105 A | * | 7/1929 | Thiefels | ............................ 74/587 |
| 1,768,508 A | * | 6/1930 | Chase | ............................... 74/587 |
| 1,935,041 A | * | 11/1933 | Armacost | ................... 29/890.14 |
| 1,963,905 A | * | 6/1934 | Huber | ........................... 72/242.2 |
| 2,502,737 A | * | 4/1950 | Meley et al. | ............. 29/888.092 |
| 3,110,101 A | * | 11/1963 | Kieffer et al. | .................. 228/155 |
| 3,221,527 A | * | 12/1965 | Roehrs | ............................... 72/80 |
| 3,314,277 A | * | 4/1967 | Hopkins et al. | .................. 72/375 |
| 3,371,407 A | * | 3/1968 | Forsyth et al. | ............. 228/173.2 |
| 3,494,164 A | * | 2/1970 | Rehm et al. | ...................... 72/187 |
| 3,625,277 A | * | 12/1971 | Watts | ............................. 164/461 |
| 3,750,264 A | * | 8/1973 | Nilsson | ......................... 228/131 |
| 4,015,765 A | * | 4/1977 | Ahmed | ......................... 228/131 |
| 4,414,860 A | | 11/1983 | Brunsch et al. | |
| 4,425,820 A | * | 1/1984 | Swozil | ........................ 74/579 R |
| 4,441,240 A | * | 4/1984 | Mori | ........................ 29/888.091 |
| 4,458,555 A | * | 7/1984 | Holtzberg et al. | ........... 74/579 E |

(Continued)

FOREIGN PATENT DOCUMENTS

JP          62242116 A     10/1987

(Continued)

*Primary Examiner* — David Bryant
*Assistant Examiner* — Jason L Vaughan
(74) *Attorney, Agent, or Firm* — Rader, Fishman & Grauer PLLC

(57) ABSTRACT

A connecting rod and methods for making the same are disclosed. A method of making a connecting rod may include joining a first connecting rod blank and a second connecting rod blank together. The first connecting rod blank includes a first material, while the second connecting rod blank includes a second material different from the first material. The first and second connecting rod blanks have an interface between the piston pin and crankshaft ends. The method further includes narrowing a cross-section of the blanks at the interface, forming a piston pin aperture in the first connecting rod blank, and forming a crankshaft pin aperture in the second connecting rod blank. At least one of the narrowing and forming steps works a perimeter of the interface, thereby forming a generally smooth connecting rod surface about the perimeter of the interface.

20 Claims, 4 Drawing Sheets

U.S. PATENT DOCUMENTS

| | | | | |
|---|---|---|---|---|
| 4,927,070 A * | 5/1990 | Kretchmer | | 228/155 |
| 5,016,807 A * | 5/1991 | Haack | | 228/170 |
| 5,065,934 A * | 11/1991 | Ito | | 228/114.5 |
| 5,327,813 A * | 7/1994 | DeBell et al. | | 92/187 |
| 5,370,093 A * | 12/1994 | Hayes | | 123/197.4 |
| 5,491,883 A * | 2/1996 | Marlinga | | 29/421.1 |
| 5,507,093 A * | 4/1996 | Wittenstein et al. | | 29/888.09 |
| 5,544,413 A * | 8/1996 | Stevens et al. | | 29/888.092 |
| 5,673,666 A * | 10/1997 | Beardmore et al. | | 123/197.3 |
| 5,720,092 A * | 2/1998 | Ni et al. | | 29/421.1 |
| 5,826,331 A * | 10/1998 | Myers et al. | | 29/888.09 |
| 5,878,491 A * | 3/1999 | Morgen et al. | | 29/888.09 |
| 5,980,799 A * | 11/1999 | Martakos et al. | | 264/127 |
| 6,134,779 A * | 10/2000 | Walker et al. | | 29/888.092 |
| 6,490,790 B1 * | 12/2002 | Soga et al. | | 29/888.09 |
| 6,692,841 B2 * | 2/2004 | Shindo et al. | | 428/609 |
| 6,775,908 B2 * | 8/2004 | Ohara et al. | | 29/888.1 |
| 6,978,545 B2 * | 12/2005 | Marando | | 29/897.2 |
| 6,986,193 B2 * | 1/2006 | Byrne et al. | | 29/514 |
| 7,222,913 B2 * | 5/2007 | Womack et al. | | 296/205 |
| 7,267,258 B2 * | 9/2007 | Pfeiler | | 228/112.1 |
| 7,448,971 B1 * | 11/2008 | Smalley | | 473/564 |
| 7,762,123 B2 * | 7/2010 | Helasuo et al. | | 73/54.28 |
| 7,802,493 B2 * | 9/2010 | Kubota et al. | | 74/579 R |
| 7,818,929 B2 * | 10/2010 | Fiutak et al. | | 52/223.7 |
| 2003/0070278 A1 * | 4/2003 | Chakravarti | | 29/527.1 |
| 2004/0074335 A1 * | 4/2004 | Whitney | | 74/579 R |
| 2004/0134306 A1 * | 7/2004 | Liu | | 74/579 R |
| 2005/0132557 A1 * | 6/2005 | Byrne et al. | | 29/514 |
| 2006/0260126 A1 * | 11/2006 | Groh et al. | | 29/889.2 |
| 2006/0283287 A1 * | 12/2006 | Pankl | | 74/579 E |
| 2007/0151409 A1 * | 7/2007 | Kubota et al. | | 74/593 |
| 2007/0261514 A1 * | 11/2007 | Geiman et al. | | 74/579 R |
| 2008/0271562 A1 * | 11/2008 | Yasuhara et al. | | 74/579 E |

FOREIGN PATENT DOCUMENTS

| | | |
|---|---|---|
| JP | 08320014 A | 12/1996 |
| WO | WO-9928638 A1 | 6/1999 |
| WO | WO-0206658 A1 | 1/2002 |

* cited by examiner

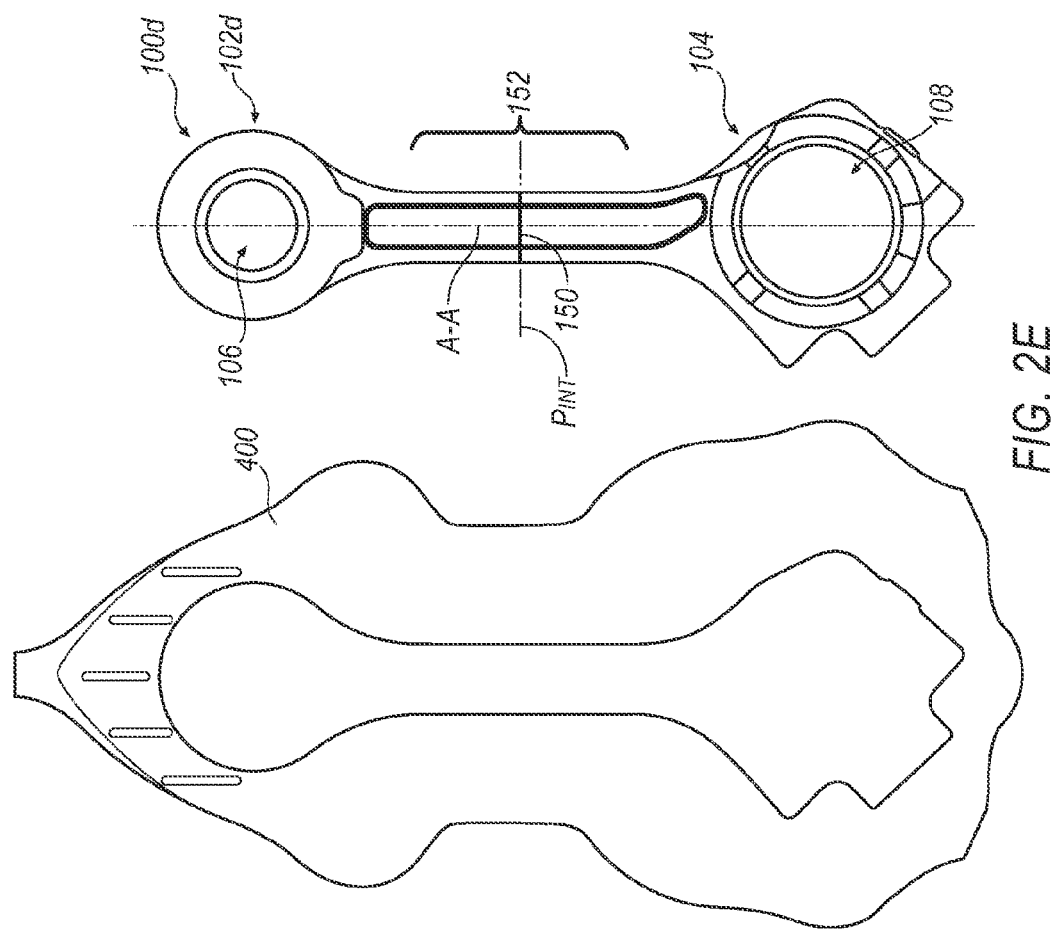
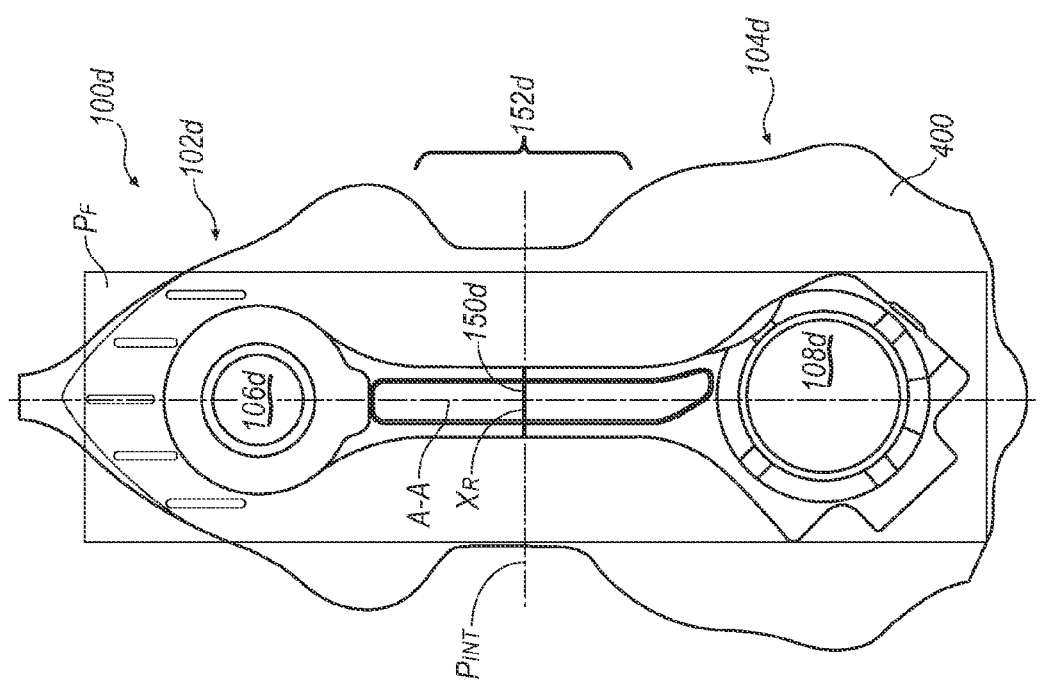
FIG. 2E
FIG. 2D

METHOD OF FORMING A CONNECTING ROD FROM TWO DISSIMILIAR MATERIALS BY PROVIDING MATERIAL BLANKS OF DISSIMILIAR MATERIAL, JOINING THE MATERIAL BLANKS AND SUBSEQUENTLY FORMING THE CONNECTING ROD

BACKGROUND

The traditional internal combustion engine relies on connecting rods for transmitting combustion power from a piston main body a crankshaft of the engine, thereby converting the linear motion of the piston main body to rotational motion at the crankshaft. Combustion power is generated from the intermittent ignition of gasoline that is injected into the combustion chamber, which creates extreme temperatures and pressures that are applied to the connecting rod. Further, combustion cycles occur thousands of times per minute during engine operation. Therefore the connecting rods are preferably relatively light to minimize overall weight that is acted upon by the combustion pressure of the engine. In order to meet these extreme competing demands, compromises must generally be made in the selection of a material from which connecting rods of an engine are formed.

Connecting rods have been formed from two different materials to better meet competing requirements for strength and weight of the connecting rod. However, connecting rods formed from multiple materials are relatively expensive and complex to manufacture. For example, the forming of a connecting rod from multiple materials generally necessitates a variety of finishing operations after the materials are joined or bonded together, to ensure a smooth and stable bond between the materials that will be durable over the life of the engine. These finishing operations add more cost to the manufacturing process. Thus, while connecting rods employing two different materials may allow fewer compromises in balancing the weight of a connecting rod versus its overall strength, the cost of manufacturing these connecting rods is much greater than traditional single-material connecting rod designs.

Accordingly, there is a need in the art for a connecting rod employing at least two different materials that is nonetheless relatively cost-effective and simple to manufacture.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIG. 2D is a side view of the formed connecting rod blank of FIG. 2C after a subsequent forming operation to produce a connecting rod having a material flash;

FIG. 2E is a side view of a the formed connecting rod of FIG. 2D with the material flash removed from the connecting rod.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

According to various exemplary illustrations, connecting rods and methods of making the same are disclosed herein. A method of making the connecting rod may include joining a first connecting rod blank and a second connecting rod blank together. The first connecting rod blank may correspond to a piston pin end and include a first material, while the second connecting rod blank may correspond to a crankshaft end of the connecting rod and include a second material different from the first material. The first and second connecting rod blanks may have an interface between the piston pin and crankshaft ends. The method may further include narrowing a cross-section of the blanks at the interface, forming a piston pin aperture in the first connecting rod blank, and forming a crankshaft pin aperture in the second connecting rod blank, each of these steps occurring after joining the first and second connecting rod blanks. At least one of the narrowing and forming steps may work a perimeter of the interface, thereby forming a generally smooth connecting rod surface about the perimeter of the interface. The connecting rod may finally be assembled to a piston.

Figures 1A, 1B:
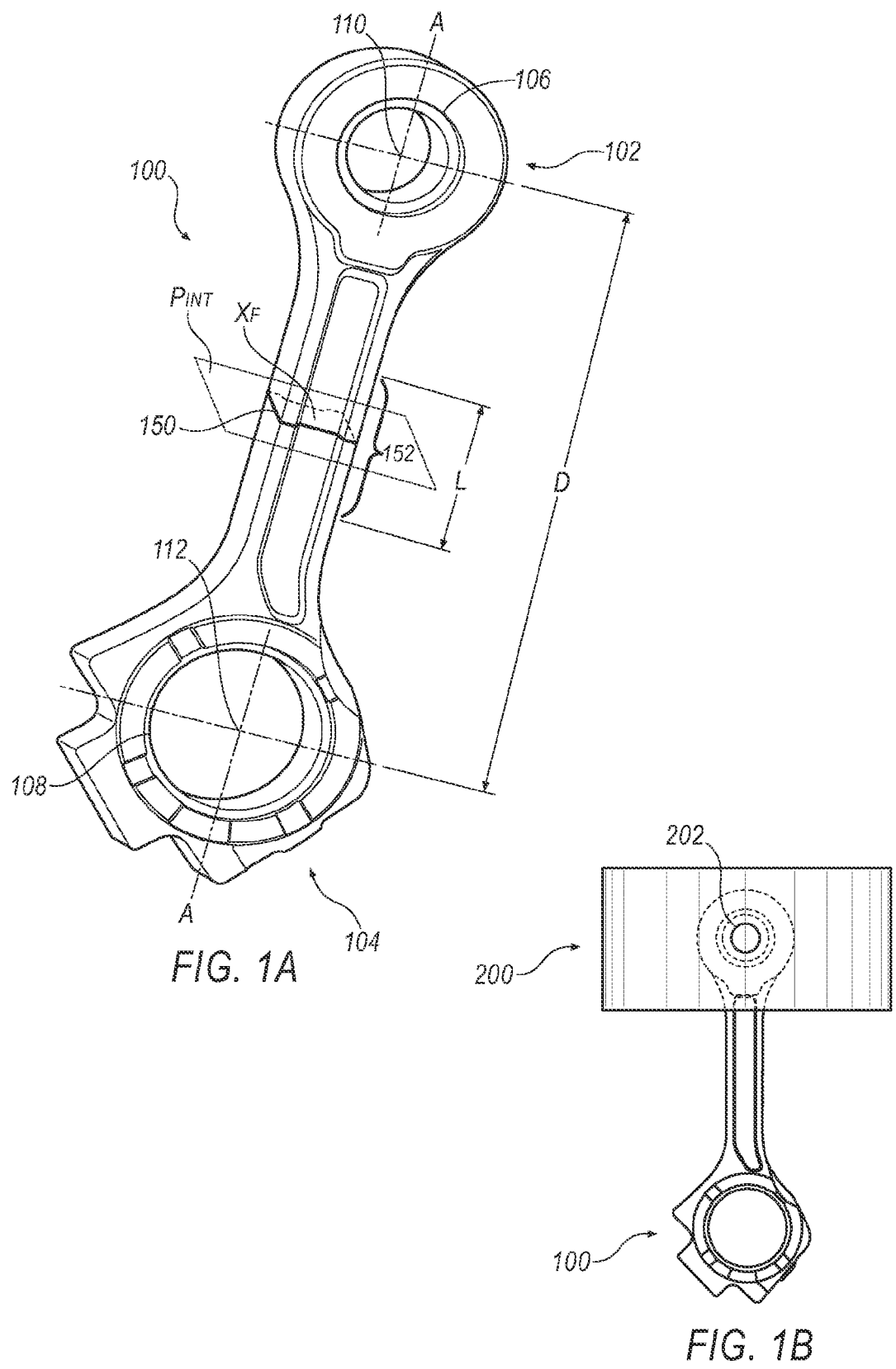
FIG. 1A is a perspective view of an exemplary connecting rod.
FIG. 1B is a side view of the connecting rod shown in FIG. 1A assembled with a piston main body and piston pin.

Turning now to FIG. 1A, a connecting rod 100 is illustrated. Connecting rod 100 includes a piston pin or small end 102 and a crank shaft or large end 104. The piston pin end 102 defines a piston pin aperture 106 and a piston pin aperture center 110. The crank shaft or large end 104 generally defines a crank shaft pin aperture 108 that has a crank shaft pin aperture center 112. The connecting rod 100 is formed of two different materials. For example, piston pin end 102 is formed of a first material and crank shaft end 104 is formed of a second material. Various combinations of materials may be provided to allow for different design considerations. For example, piston pin end 102 may be formed of a light weight material, while crank shaft end 104 is formed of relatively stronger, and perhaps heavier, material. Merely as examples, some possible material combinations include steel/steel, steel/sintered powdered metal, or aluminum/titanium. Typically, material strength may be a higher priority than light weight for the crank shaft end 104 as compared with the piston pin end 102, and thus light weight may be a higher priority for the piston pin end 102 compared with the crank shaft end 104. However, any material combination that is convenient may be employed.

Ends 102 and 104 of the connecting rod 100 cooperate to generally define a longitudinal axis A of connecting rod 100. Further, the ends 102 and 104 generally cooperate to define a distance D between aperture centers 110,112.

The piston pin end 102 and crank shaft end 104 are joined at an interface 150. As shown in FIG. 1A, interface 150 may be generally disposed in a plane of the connecting rod 100 $P_{INT}$ although other interface geometries may also be used, including geometries that may increase the surface area of contact between piston end 102 and crank shaft end 104. The interface 150 may be provided in an interface region 152 of connecting rod 100 that extends along a portion of the connecting rod 100. The interface region 152 extends along a length of the connecting rod 100. For example, as shown in FIG. 1A, the interface region 152 may generally have a length L extending along the axis A of the connecting rod 100. The interface region 152 may extend along the axis A of the connecting rod 100 any distance L that is convenient. While the length L is shown in FIG. 1A as being approximately equal to one quarter of the distance D defined between the aperture centers 110, 112, this distance may be smaller or larger. In some examples, the interface region 152 may include substantially an entire portion of the connecting rod 100 that is disposed between the piston pin aperture 106 and the crankshaft pin aperture 108. Further, while the interface 150 is shown located generally centrally between the ends 102 and 104, i.e., between the aperture centers 110, 112, the interface may be anywhere in between the piston pin aperture 106 and crankshaft pin aperture 108.

Turning now to FIG. 1B, the connecting rod 100 is shown assembled with a piston. More specifically, connecting rod 100 maybe assembled to a piston main body 200 by way of a piston pin 202. In other words, a piston pin 202 may be received in the piston pin end 102 of the connecting rod 100, i.e., within piston pin aperture 106, thereby generally securing the connecting rod 100 to the piston main body 200.

Figure 2C:
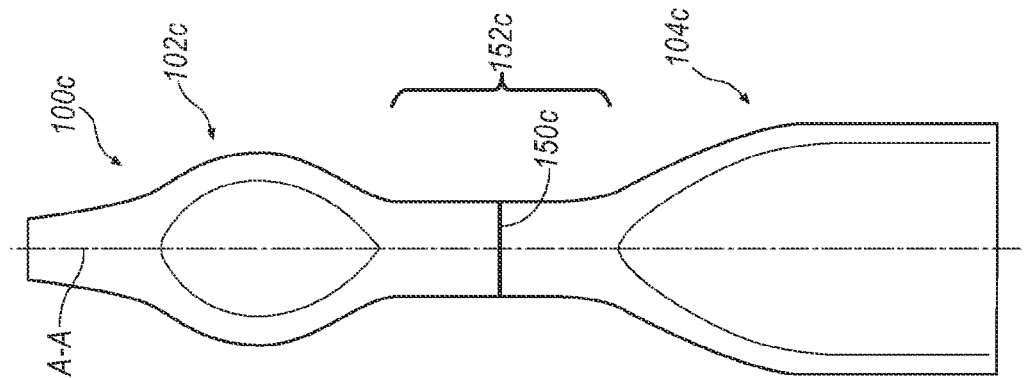
FIG. 2C is a side view of the formed connecting rod blank of FIG. 2B after a subsequent forming operation.

Proceeding to FIGS. 2A-2E, a general process for forming the connecting rod 100 will be described. In FIG. 2A, a composite connecting rod blank 100a is formed initially from a piston pin end blank 102a and a crank shaft end blank 104a. The piston pin end blank 102a may be formed of a first material, while the crank shaft end blank 104a is formed of a second material that is different from the first material. The piston pin end blank 102a and crank shaft end blank 104a are joined at interface 150a. As shown in FIG. 2A, interface 150a is disposed within interface region 152a of the blank 100a, and may initially be generally circular in cross-section, as best seen in the cross-section $X_C$ taken through interface 150a. The piston pin end blank 102a and cranks shaft end blank 104a may be joined by any means that is convenient, for example, a friction welding operation may be used such as a rotational friction welding. Rotational friction welding may be most convenient where, as shown in FIG. 2A, piston pin end blank 102a and crank shaft end blank 104a each have a generally circular cross-section. Other methods of joining the blanks 102a and 104a may be employed where convenient.

Figure 2B:
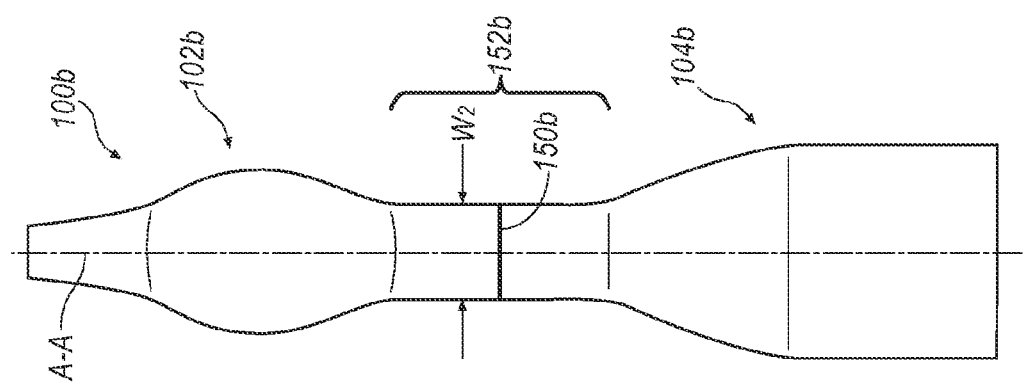
FIG. 2B is a side view of the connecting rod blank of FIG. 2A after an initial forming operation.
Figure 2A:
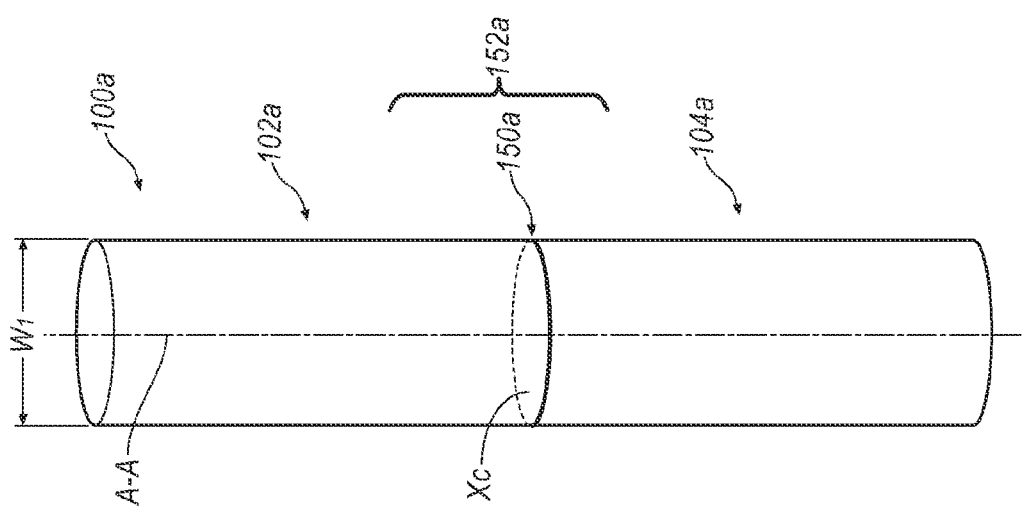
FIG. 2A is a side view of an exemplary connecting rod blank formed from two materials.

Turning now to FIG. 2B, the connecting rod blank 100a is narrowed at interface 150a to form a connecting rod blank 100b having a narrowed interface 150b. In other words, comparing FIGS. 2A and 2B, a cross-sectional width $W_1$ of the rod 100a is generally reduced to a width $W_2$ in FIG. 2B. Furthermore, the narrowing of the interface region 152b and/or interface 150b generally smoothes the surface of the rod 100b about a perimeter of the interface 150b within the interface region 152b. For example, a roll forming operation may be employed that generally works directly upon the interface 150a, thereby narrowing the cross-section of the rod 100a adjacent the interface 150a and also smoothing the surface about the perimeter of the interface 150a, resulting in a narrowed rod 100b having a generally smooth surface about a perimeter of the interface 150b.

Referring now to FIG. 2C, a connecting rod blank 100c is shown having a generally quadrangular-sectioned piston pin end 102c and crank shaft end 104c. This transitional shape may result from a pre-forging operation that generally forms the rod 100c to a quadrangular-sectioned shape that is generally between the initially round shape shown in FIGS. 2A and 2B, and the final quadrangular-sectioned shape of the connecting rod (e.g., as shown in the perspective view of FIG. 1A). The transitional shape shown in FIG. 2C may allow a subsequent forging or other forming operation to more easily form a desired final shape of the connecting rod 100. The pre-forging operation may further smooth surfaces of rod 100c, e.g., the perimeter of interface 150c and/or interface region 152c.

Turning now to FIG. 2D, the connecting rod blank 100d is shown after the forming of the piston pin end 102d and crankshaft end 104d is generally complete, with the exception of initial openings 106d, 108d. Openings 106d, 108d have a material flash such that the opening does not extend all the way through the piston pin end 102d or crank shaft end 104d in an axial direction. The material flash is thus subsequently removed to form the apertures 106, 108. The blank 100d also includes a material flash 400 generally extending about the perimeter of the connecting rod 100d. As shown in FIG. 2D, the material flash 400 is generally disposed in a plane $P_F$ that is generally perpendicular to plane $P_{INT}$. In other words, the material flash 400 is generally disposed in a plane $P_F$ that is generally normal to the interface 150d between the ends 102d and 104d. The formation of connecting rod 100 is thus generally complete in connecting rod blank 100d, with the exception of the material flash 400 and the material flash within openings 106d and 108d.

Referring now to FIG. 2E, a generally complete connecting rod 100 is illustrated. The connecting rod 100 now has the material flash 400 and the material flash from openings 106d, 108d removed. The material flash 400 and material flash from openings 106d and 108d that is removed may all be generally disposed in plane $P_F$, and may thus be generally perpendicular to plane $P_{INT}$.

Figure 3:
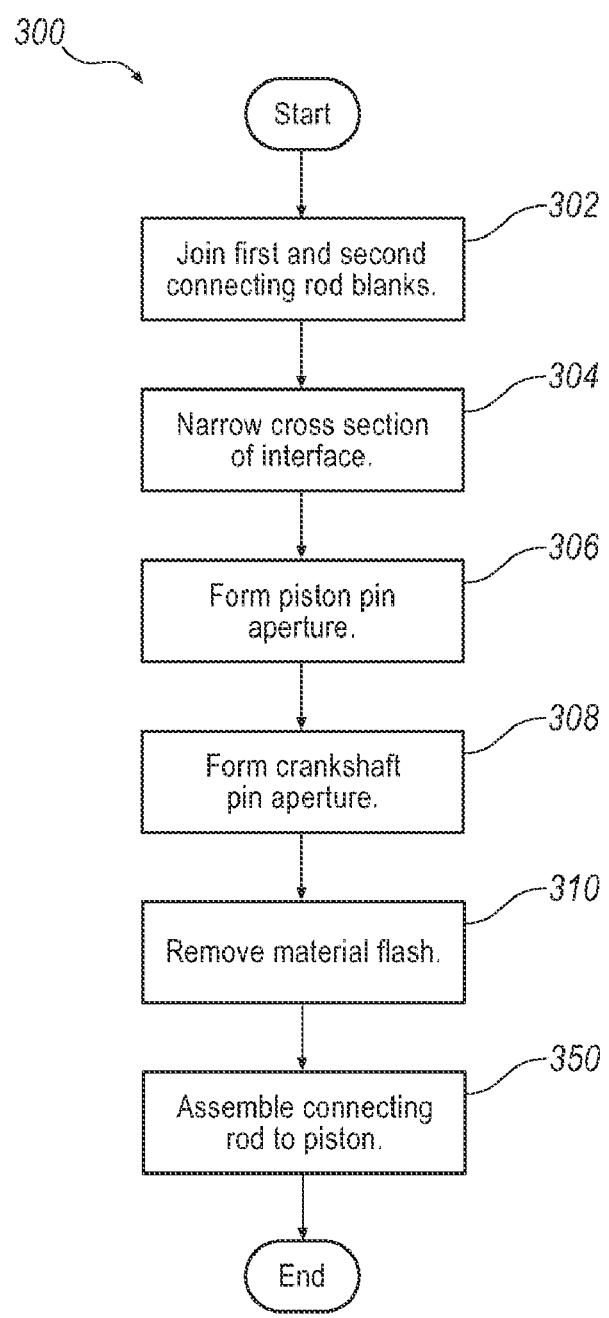
FIG. 3 is a process flow diagram of an exemplary connecting rod forming process.

With specific reference to FIG. 3, a process 300 for forming a connecting rod and/or assembling a piston is described. Process 300 generally begins at steps 302 to 310, where the connecting rod is initially produced or formed. In step 302, a first connecting rod blank and a second connecting rod blank are joined together. For example, the first connecting rod blank may be a piston pin end blank 102a that corresponds to a piston pin end 102 of the connecting rod 100, while the second connecting rod blank be a crank shaft end blank 104a that corresponds to a crank shaft end 104 of the connecting rod 100, or vice versa. The first connecting rod blank is formed of a first material, while the second connecting rod blank is formed of a second material that is different from the first material. The first and second connecting rod blanks 102a and 104a generally define an interface therebetween. For example, an interface 150a may be generally established in an interface plane $P_{INT}$ where the first and second connecting rod blanks are joined, as described above. Furthermore, the interface plane $P_{INT}$ may be disposed generally perpendicular to a longitudinal axis A that is defined collectively by the first and second connecting rod end blanks 102a, 104a. The first and second connecting rods end blanks 102a and 104a may be joined by a friction welding operation, e.g., rotational friction welding, or by any other process that is convenient. Process 300 may then continue to step 304.

In step 304, the cross-sections of the first and second connecting rod blanks are generally narrowed at the interface after the connecting rod blanks are joined. For example, as described above, a roll forming operation may be employed to narrow a width $W_1$ of cross-section $X_C$ of the initial rod 100A to a reduced width $W_2$ of the narrowed connecting rod 100B. Furthermore, the roll forming operation may be performed generally at or around the interface 150, such that the roll forming operation generally works about a perimeter of the interface 150 and forming the generally smooth connecting rod surface about the perimeter of the interface 150 and/or interface region 152. The narrowing of the interface 150 between the first and second blanks also work hardens the material of the first and second blanks, thereby hardening and strengthening the narrowed portions of each as well as adjacent portions of the first and second blanks. The narrowing may also strengthen the bond between the first and second blanks, especially where they are bonded together in a welding operation. Additionally, the narrowing of the interface 150, e.g., in a rolling operation, may allow a material grain-flow of the connecting rod 100 to be generally uninterrupted approaching or across the interface 150 between the two different materials of the piston pin end 102 and crank shaft end 104. Process 300 may then continue to step 306.

In step 306, the piston pin aperture may be formed in the first connecting rod blank after joining the first and second connecting rod blanks. For example, as described above, the piston pin aperture 106 may be formed in the connecting rod 100 by any combination of forming operations, such as forging operations. In other words, as described above in regard to FIGS. 2B, 2C and 2D and 2E, the piston pin aperture 106 may be generally formed in a series of forging operations such as hot forging. Any other method for forming piston pin apertures may be employed. Process 300 may then continue to step 308.

In step 308, the crank shaft pin aperture 108 is formed in the second connecting rod blank 104 after joining the first and second connecting rod blanks. For example, as described above, the crank shaft pin aperture 108 may be formed in the second connecting rod blank 104a in a series of forging operations as shown in FIGS. 2B-2E.

In steps 304, 306 and 308 any one of the narrowing or forming steps described may work a perimeter of the interface 150, thus forming or smoothing the connecting rod surface about the perimeter of the interface 150. Further, any of these smoothing operations may occur not only directly at the interface 150 but along a portion of, substantially entire, or the entire interface region 152 that extends at least partly along the length of the connecting rod 100. The connecting rod surface may therefore be generally smooth along a length that includes the interface 150 as well as adjacent portions of the connecting rod. For example, as described above, an interface region 152 may be generally centrally disposed between the crank shaft aperture 108 and a piston pin aperture 106, and the interface region 152 may extend approximately one quarter of the overall length defined between the aperture centers 110, 112. The smoothing of the connecting rod surface may be most effective during a narrowing operation associated with the connecting rod 100. For example, roll forming may lend itself well to smoothing the surface about the interface 150. This reduces or entirely eliminates the need for any finishing operations around interface 150 e.g. within interface region 152, as the forming operation, e.g., roll forming, smoothes the surface without any significant undulations that are artifacts of the joining of the separate connecting rod blanks 102a, 104a. Accordingly, once the connecting rod 100 is formed, generally no finishing operations, e.g., grinding, cutting, sanding, etc., are necessary to remove material flash disposed in a same plane, e.g., $P_{INT}$, as the interface 150.

The steps 304, 306, 308 may also generally shape an initially round or circular cross-section of the connecting rod blanks 102a, 104a at the interface 150a into a generally quadrangular cross-section. In other words, any of the forging, rolling, or other operations described herein may work a perimeter of the connecting rod blanks about the interface 150, thus shaping an initially round cross-section of the blanks (e.g., as best seen in FIG. 2A) to a generally quadrangular cross section defining at least four generally flat sides. For example, the round cross-section initially present at interface 150 may be shaped into a generally H-shaped cross-section $X_F$ typical of connecting rods, as best seen in FIG. 1A. Other examples of generally quadrangular cross-sections may include those that are generally square, generally rectangular, or the like.

Proceeding to step 310, a material flash 400 may be removed from a perimeter of the first and second connecting rod blanks 102, 104 after the narrowing operation. The material flash 400, as seen best in FIG. 2D, is generally disposed in a flash plane $P_F$ that includes the longitudinal axis A. In other words, the flash plane $P_F$ typically extends along an entire length of the pre-formed connecting rod blank, e.g., connecting rod blank 100d. Process 300 may then continue to step 350.

In step 350, a connecting rod is assembled with a piston. For example, as described above in regard to FIG. 1B, connecting rod 100 may be assembled to a piston body 200 with a piston pin 202.

Accordingly, the connecting rod 100 is formed using a process 300 that requires little, if any, finishing steps to generally smooth surfaces at the interface between the separate materials used to form the connecting rod 100. A variety of different materials may thus be combined to form a connecting rod and meet disparate weight and strength requirements that may be associated with different portions of a connecting rod, while not adding significant complexity to the manufacture of the connecting rod.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of forming a connecting rod, comprising:
    joining a first connecting rod blank and a second connecting rod blank together, said first connecting rod blank corresponding to a piston pin end of the connecting rod and including a first material, said second connecting rod blank corresponding to a crankshaft end of the connecting rod and including a second material different from said first material, said first and second connecting rod blanks having an interface between said piston pin and crankshaft ends;
    narrowing a cross-section of said blanks at said interface after joining said first and second connecting rod blanks;
    forming a piston pin aperture in said first connecting rod blank after joining said first and second connecting rod blanks; and
    forming a crankshaft pin aperture in said second connecting rod blank after joining said first and second connecting rod blanks;
    wherein at least one of said narrowing and said forming steps works a perimeter of said interface, thereby forming a generally smooth connecting rod surface about said perimeter of said interface.

2. The method of claim 1, further comprising establishing said joining of said first and second connecting rod blanks as rotational friction welding.

3. The method of claim 1, further comprising establishing said narrowing as roll-forming said first and second connecting rod blanks at said interface, said roll-forming step working said perimeter of said interface, thereby forming said generally smooth connecting rod surface about said perimeter of said interface.

4. The method of claim 1, said narrowing working said perimeter of said interface, thereby increasing a strength of said interface.

5. The method of claim 1, further comprising establishing said forming of said piston pin aperture and said crankshaft pin aperture as forging said piston pin and crankshaft, said forging working said perimeter of said interface, thereby forming said generally smooth connecting rod surface about said perimeter of said interface.

6. The method of claim 1, wherein said first and second connecting rod blanks cooperate to form a longitudinal axis after joining said first and second connecting rod blanks, said longitudinal axis extending between said piston pin and crankshaft pin ends; and further comprising:
    establishing said interface generally in an interface plane; and
    establishing said interface plane as being generally perpendicular to said longitudinal axis.

7. The method of claim 6, further comprising removing a material flash from a perimeter of said first and second connecting rod blanks after said narrowing, said material flash oriented in a flash plane including said longitudinal axis.

8. The method of claim 1, wherein said first and second connecting rod blanks cooperate to form a longitudinal axis after joining said first and second connecting rod blanks, said longitudinal axis extending between said piston pin and crankshaft ends; and further comprising:
    establishing said interface in an interface region extending along said longitudinal axis, said interface region defining a length along said longitudinal axis, said length being at least one quarter of a distance measured between a center of said crankshaft aperture and said piston pin aperture;
    wherein said at least one of said narrowing and said forming steps results in a generally smooth connecting rod surface about said perimeter of said interface along substantially an entire portion of said length.

9. The method of claim 1, further comprising establishing a cross section of said first and second connecting rod blanks at said interface as a generally round cross-section, one of said narrowing step and said forming steps including forming a generally quadrangular cross section in said first and second connecting rod blanks at said interface.

10. The method of claim 1, wherein joining said first connecting rod blank and said second connecting rod blank together includes establishing the first and second connecting rod blanks as presenting generally circular cross-sections at said interface.

11. A method of manufacturing a piston, comprising:
    making a connecting rod, including:
        joining a first connecting rod blank and a second connecting rod blank together, said first connecting rod blank corresponding to a piston pin end of said connecting rod and including a first material, said second connecting rod blank corresponding to a crankshaft end of said connecting rod and including a second material different from said first material, said first and second connecting rod blanks having an interface between said piston pin and crankshaft ends;
    narrowing a cross-section of said blanks at said interface after joining said first and second connecting rod blanks;
    forming a piston pin aperture in said first connecting rod blank after joining said first and second connecting rod blanks;
    forming a crankshaft pin aperture in said second connecting rod blank after joining said first and second connecting rod blanks; and
    assembling said connecting rod to a piston;
    wherein at least one of said narrowing and said forming steps works a perimeter of said interface, thereby forming a generally smooth connecting rod surface about said perimeter of said interface.

12. The method of claim 11, further comprising establishing said joining of said first and second connecting rod blanks as rotational friction welding.

13. The method of claim 11, further comprising establishing said narrowing as roll-forming said first and second connecting rod blanks at said interface, said roll-forming working said perimeter of said interface, thereby forming said generally smooth connecting rod surface about said perimeter of said interface.

14. The method of claim 11, said narrowing working said perimeter of said interface, thereby increasing a strength of said interface.

15. The method of claim 11, further comprising establishing said forming of said piston pin aperture and said crankshaft pin aperture as forging said piston pin and crankshaft, said forging working said perimeter of said interface, thereby forming said generally smooth connecting rod surface about said perimeter of said interface.

16. The method of claim 11, said first and second connecting rod blanks cooperating for forming a longitudinal axis after joining said first and second connecting rod blanks, said longitudinal axis extending between said piston pin and crankshaft pin ends; and further comprising establishing said interface as including a component generally perpendicular to said longitudinal axis.

17. The method of claim 16, further comprising removing a material flash from a perimeter of said first and second connecting rod blanks after said narrowing, said material flash being generally oriented in a flash plane including said longitudinal axis.

18. The method of claim 11, said first and second connecting rod blanks cooperating for forming a longitudinal axis after joining said first and second connecting rod blanks, said longitudinal axis extending between said piston pin and crankshaft ends; and further comprising:

establishing said interface in an interface region extending along said longitudinal axis, said interface region defining a length along said longitudinal axis, said length being at least one quarter of a distance measured between a center of said crankshaft aperture and said piston pin aperture;

wherein said at least one of said narrowing and said forming steps results in a generally smooth connecting rod surface about said perimeter of said interface along at least substantially an entire portion of said length.

19. The method of claim 11, further comprising establishing a cross section of said first and second connecting rod blanks at said interface as a generally round cross-section, wherein one of said narrowing step and said forming steps includes forming a generally quadrangular cross section in said first and second connecting rod blanks at said interface.

20. The method of claim 11, wherein joining said first connecting rod blank and said second connecting rod blank together includes establishing the first and second connecting rod blanks as presenting generally circular cross-sections at said interface.

* * * * *